United States Patent [19]

Miyagawa et al.

[11] Patent Number: 5,557,449
[45] Date of Patent: Sep. 17, 1996

[54] LASER BEAM SCANNING APPARATUS FOR CONTROLLING DIAMETER OF LIGHT SPOT

[75] Inventors: Fumihiro Miyagawa, Yokohama; Shuichi Yamazaki, Fujimi, both of Japan

[73] Assignee: Ricoh Company, Ltd., Tokyo, Japan

[21] Appl. No.: 233,801

[22] Filed: Apr. 26, 1994

[30] Foreign Application Priority Data

Apr. 27, 1993 [JP] Japan ................................. 5-101217

[51] Int. Cl.⁶ .................................................. G02B 26/08
[52] U.S. Cl. .......................... 359/212; 359/205; 359/216; 359/217; 347/259
[58] Field of Search ....................... 359/196–226, 359/227, 230; 346/108, 160; 355/214; 250/234–236, 229, 232, 233, 237 R; 358/505, 474, 494, 296, 302, 203; 347/259–261; 348/203

[56] References Cited

U.S. PATENT DOCUMENTS

| | | | |
|---|---|---|---|
| 4,732,485 | 3/1988 | Morita et al. | 356/376 |
| 4,999,513 | 3/1991 | Ito et al. | 356/442 |
| 5,161,047 | 11/1992 | Tomita et al. | 359/216 |
| 5,218,415 | 6/1993 | Kawashima | 250/237 R |
| 5,325,122 | 6/1994 | Hattori et al. | 346/160 |

FOREIGN PATENT DOCUMENTS

| | | |
|---|---|---|
| 58-83814 | of 1958 | Japan . |
| 57-29026 | 2/1982 | Japan . |

*Primary Examiner*—James Phan
*Attorney, Agent, or Firm*—Oblon, Spivak, McClelland, Maier, & Neustadt, P.C.

[57] ABSTRACT

A laser beam scanning apparatus includes: a light source unit for emitting a collimated laser light beam; a rotary deflector unit for deflecting a laser light beam from the light source unit; a focusing unit for converting the deflected light beam into a convergent light beam, and for focusing the convergent light beam on a recording medium as a light spot, so that the focused light beam scans the recording medium in a main scanning direction when the rotary deflector unit is rotated; and a beam shape control unit for changing the sectional shape of a laser light beam emitted by the light source unit to a first sectional shape by restricting the laser light beam by using an opening of the beam shape control unit, the opening of the beam shape control unit having a predetermined sectional shape and dimensions, so that a diameter of the light spot on the recording medium is changed to a desired diameter.

15 Claims, 7 Drawing Sheets

LASER BEAM SCANNING APPARATUS FOR CONTROLLING DIAMETER OF LIGHT SPOT

BACKGROUND OF THE INVENTION

1. Field of the Invention

The present invention generally relates to a laser beam scanning apparatus, and more particularly to a laser beam scanning apparatus for controlling a diameter of a light spot on a recording medium of an image forming system that is capable of varying the resolution of images on the recording medium.

2. Discussion of the Background

Laser beam scanning devices of image forming systems, such as digital copiers, laser printers and laser facsimile machines, are known. FIG. 1 shows a known laser beam scanning device. This laser beam scanning device comprises a light source unit 1 for emitting a collimated laser light ray, a cylinder lens 2 for converting the laser light ray from the light source unit 1 into a convergent light ray (which converges only in a sub-scanning direction), a rotary polygon mirror 3 for deflecting the convergent light ray from the cylinder lens 2, an fΘ lens 4 for converting the deflected light ray into a convergent light ray (which converges in a main scanning direction) and for focusing the convergent light ray on a recording surface of a photosensitive medium 5 as a light spot. As the rotary polygon mirror 3 is rotated at a constant rotating speed, as indicated by the arrow "a" in FIG. 1, the light spot scans the recording surface of the photosensitive medium 5 in a main scanning direction, as indicated by the arrow "b" in FIG. 1, to record an image thereon. The laser light ray, deflected from the rotary polygon mirror 3, is corrected by the fΘ lens 4 to make the light spot move on the recording surface of the photosensitive medium 4 at a constant linear speed.

The laser beam scanning device in FIG. 1 further comprises a sync photodetector 6. The sync photodetector 6 receives the laser light ray from the rotary polygon mirror 3 and detects the timing of the start of each of the main scannings on the photosensitive medium 5. The recording surface of the photosensitive medium 5 is scanned in the main scanning direction in accordance with the rotation of the rotary polygon mirror 3. The sync photodetector 6 outputs a sync signal for each of the main scannings.

FIG. 2 shows the light source unit of the laser beam scanning device in FIG. 1. In FIG. 2, the light source unit 1 comprises a laser diode (LD), a collimator lens 1b, an apertured unit 1c, an LD circuit board 1d, and a casing 1f.

In FIG. 2, the laser diode (LD) 1a is connected to an LD control circuit of the LD circuit board 1d and is supported on the LD circuit board 1d. The laser diode (LD) 1a emits laser light rays according to a light emission current supplied from the LD circuit to the laser diode (LD). The light emission current is modulated in accordance with image data. The collimator lens 1b converts the laser light rays from the LD 1a into a collimated light beam. The apertured part 1c has an opening 1e by which the cross-sectional shape of the collimated light beam from the collimator lens 1b is restricted. These parts are accommodated in the casing 1f. Thus, the light source unit 1 emits the collimated light ray toward the rotary polygon mirror 3 in FIG. 1.

FIG. 3 shows the sectional shape of the opening of the apertured part 1c. The sectional shape of the collimated light ray from the light source unit 1 is changed by the aperture part 1c into the sectional shape of the aperture opening shown in FIG. 3.

For recent digital image forming systems, the capability to vary the resolution of images on a recording medium is needed. This capability is called a multi-resolution capability. It is desirable to provide an image forming system in which one of a plurality of resolutions of images (for example, 240 dpi, 300 dpi, 400 dpi and 600 dpi) on the recording medium can be selected by the user. In order to realize this capability, it is necessary to vary the diameter of the light spot on the recording medium in accordance with the user's selection. However, in the laser beam scanning device described above, the optical parts are produced and assembled according to the design of production models. It is difficult for the user to vary the diameter of the light spot on the recording medium in accordance with the user's choice by using the above laser beam scanning device.

One of the conceivable methods of varying the diameter of the light spot on the recording medium is that the apertured part of the laser beam scanning device is replaced by another apertured part whose opening has a desired shape and size. However, it is necessary to disassemble the image forming system, and, after the parts change, the new apertured part must be accurately aligned in the optical system by adjustment. Therefore, it is very difficult for the user to replace the apertured part of the laser beam scanning device by another part.

Another method of varying the diameter of the light spot is that a plurality of apertured parts having openings with different sizes are mounted on the laser beam scanning device and a mechanical unit for selecting one of the apertured parts is provided. However, it is difficult to accurately align each of the apertured parts within the optical system by adjustment. Also, in order to mount the plurality of apertured parts, it is necessary to make the size of the light source unit much greater. The size of the laser beam scanning device also becomes greater. Also, in order to mount the additional selecting unit on the laser beam scanning device, it is necessary to make the production cost higher. Thus, the above method is not appropriate for the needs of the user.

Still another method of varying the diameter of the light spot is to attach a different aperture part having a desired-size opening to the apertured part of the laser beam scanning device. However, it is difficult for the user to accurately align the attached part within the optical system by adjustment. Also, when the above mentioned method is selected, it is necessary to form the opening of the aperture part to be attached into the accurate shape and size. If the opening of the attached part is formed inaccurately, the occurrence of diffracted light rays due to the attached part becomes another problem.

The opening of the aperture part is formed through punching or photo-etching. The opening of the apertured part shown in FIG. 3 has a 2.4 mm by 0.4 mm size. However, when the opening of the apertured part is formed through punching or photo-etching so as to have such dimensions, it is unavoidable that a burr having a size on the order of 0.01 mm to 0.05 mm is produced at an edge of the opening of the apertured unit. FIG. 4 shows a burr 1g produced at an edge of the opening of the apertured unit 1c. For example, the burr 1g at the edge of the aperture opening is approximately 0.05 mm wide and 0.03 mm high, as indicated in FIG. 4. Thus, when the above method of varying the diameter of the light spot is selected, the occurrence of a diffracted light ray due to the burr at edge portions of the opening of the attached aperture part is unavoidable. Such a diffracted light ray will result in a significant problem in the optical scanning of the laser beam scanning device described above. Therefore, the above mentioned method is also not appropriate for the needs of the user.

A different method of varying the resolution of images on the recording medium without changing the shape or size of the opening of the apertured part is also conceivable. This method is to control the laser beam write clock, on which the recording of the dots to the recording medium is based, in accordance with a desired dot density. For example, the optical scanning can be performed based on a laser beam write clock corresponding to 400 dpi while the diameter of the light spot equivalent to that of 300 dpi recording is used. However, the resolution of images produced by making use of the above mentioned method becomes approximate and not accurate. In order to accurately change the resolution of images to a desired dot density, it is necessary to change the diameter of the light spot on the recording medium to a desired diameter by using one of the light spot diameter varying methods mentioned above. However, any of the conventional methods mentioned above is not suitable for the needs of the user. It is very difficult for the user to vary the resolution of images on the recording medium to a desired image resolution on the conventional laser beam scanning device.

SUMMARY OF THE INVENTION

Accordingly, it is a general object of the present invention to provide a novel and useful laser beam scanning apparatus in which the above mentioned problems are eliminated.

Another, more specific object of the present invention is to provide a laser beam scanning apparatus in which the sectional shape of a laser light beam emitted by a light source unit is restricted by an opening of a liquid crystal shutter, the opening of the liquid crystal shutter having a selected one of a plurality of predetermined sectional shapes, so that the diameter of a light spot on a recording medium is changed to a desired diameter.

Still another object of the present invention is to provide a laser beam scanning apparatus on which the user can easily change the resolution of images on a recording medium to a desired image resolution.

The above mentioned objects of the present invention are achieved by a laser beam scanning apparatus which includes: a light source unit for emitting a collimated laser light beam; a rotary deflector unit for deflecting a laser light beam arriving from the light source unit; a focusing unit for converting the deflected light beam into a convergent light beam, and for focusing the convergent light beam on a recording medium as a light spot, so that the focused light beam scans the recording medium in a main scanning direction when the rotary deflector unit is rotated; and a beam shape control unit for changing the sectional shape of a laser light beam emitted by the light source unit to a first sectional shape by restricting the laser light beam by using an opening of the beam shape control unit, the opening of the beam shape control unit having a predetermined sectional shape and dimensions, so that a diameter of the light spot on the recording medium is changed to a desired diameter.

According to the present invention, it is possible to easily and accurately change the diameter of the light spot on the recording medium to a desired diameter on the laser beam scanning apparatus. As the diameter of the light spot on the recording medium is predetermined in accordance with each of a plurality of predetermined image resolutions, the user can easily change the resolution of images on the recording medium to a desired image resolution on the laser beam scanning apparatus of the present invention.

BRIEF DESCRIPTION OF THE DRAWINGS

The above and other objects, features and advantages of the present invention will be more apparent from the following detailed description when read in conjunction with the accompanying drawings in which.

DESCRIPTION OF THE PREFERRED EMBODIMENTS

Figure 1:
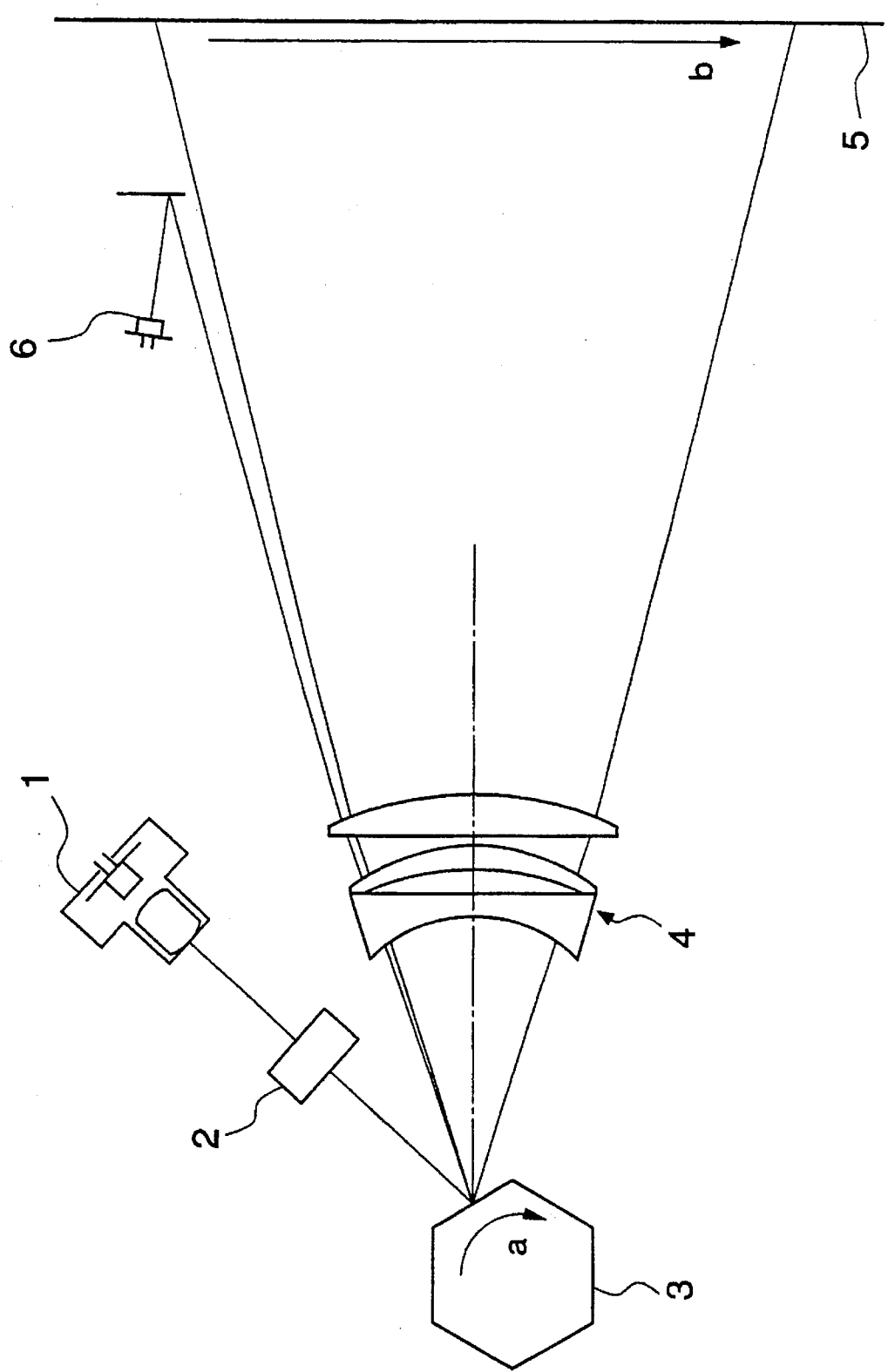
FIG. 1 is a diagram showing a laser beam scanning device according to the prior art.
Figure 2:
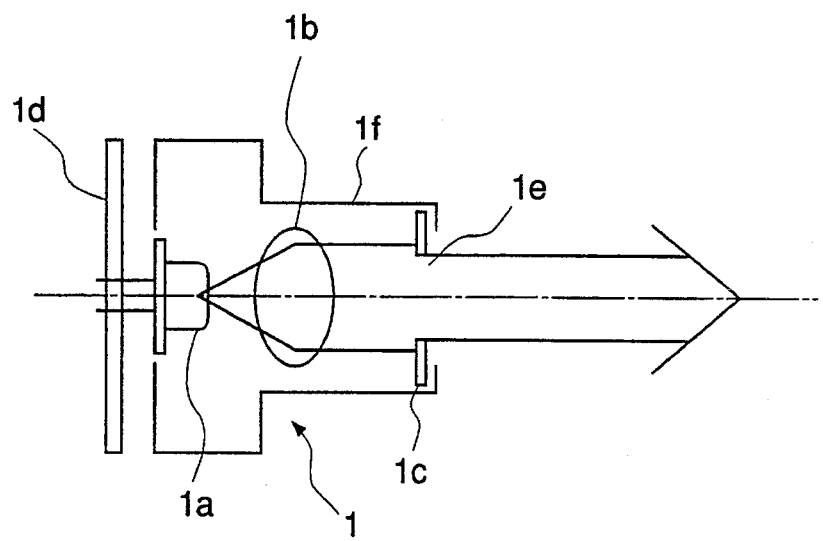
FIG. 2 is a diagram showing a light source unit of the laser beam scanning device in FIG. 1.
Figure 5:
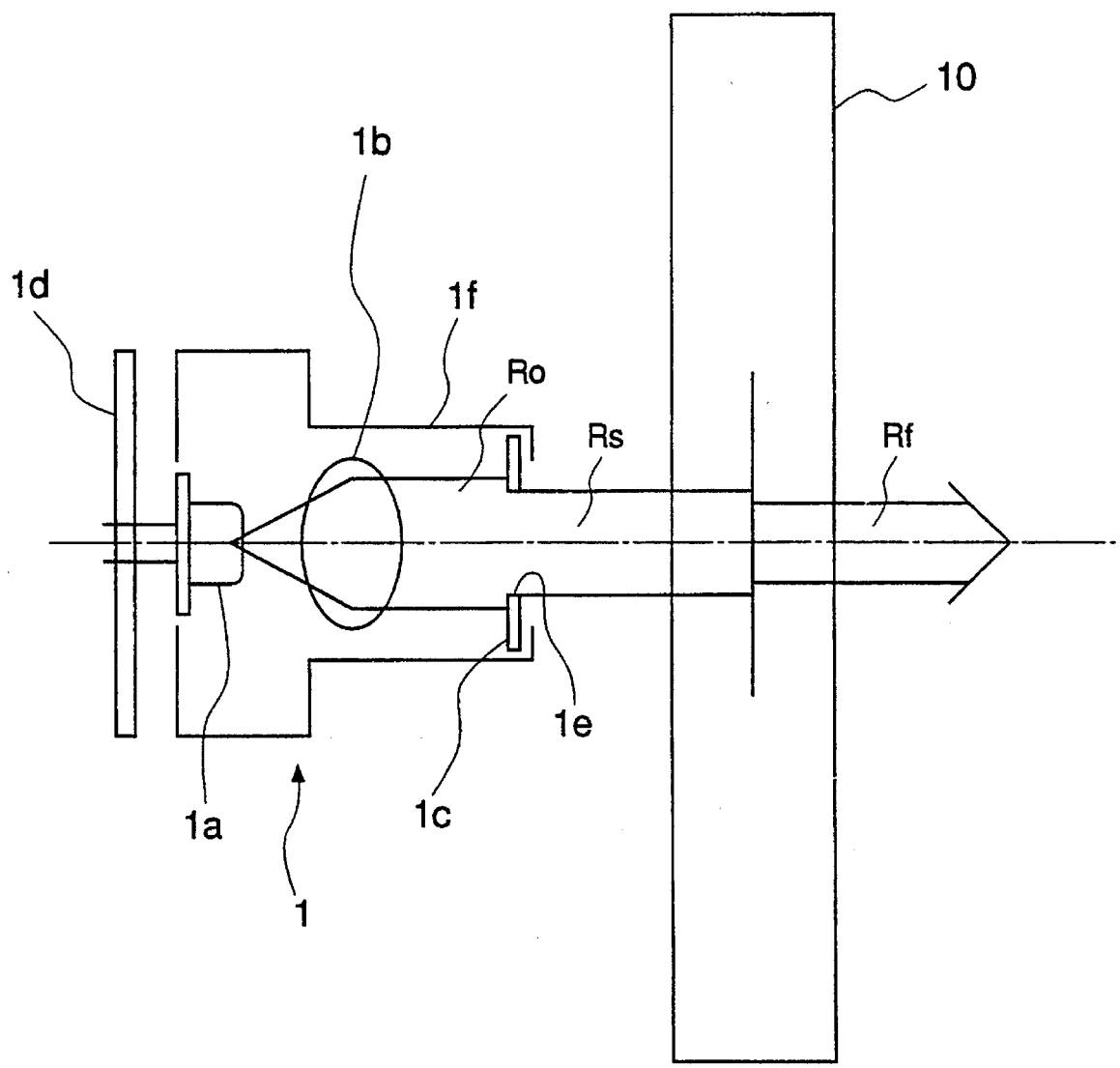
FIG. 5 is a diagram showing a liquid crystal shutter of an optical scanning apparatus according to the present invention.
Figure 6:
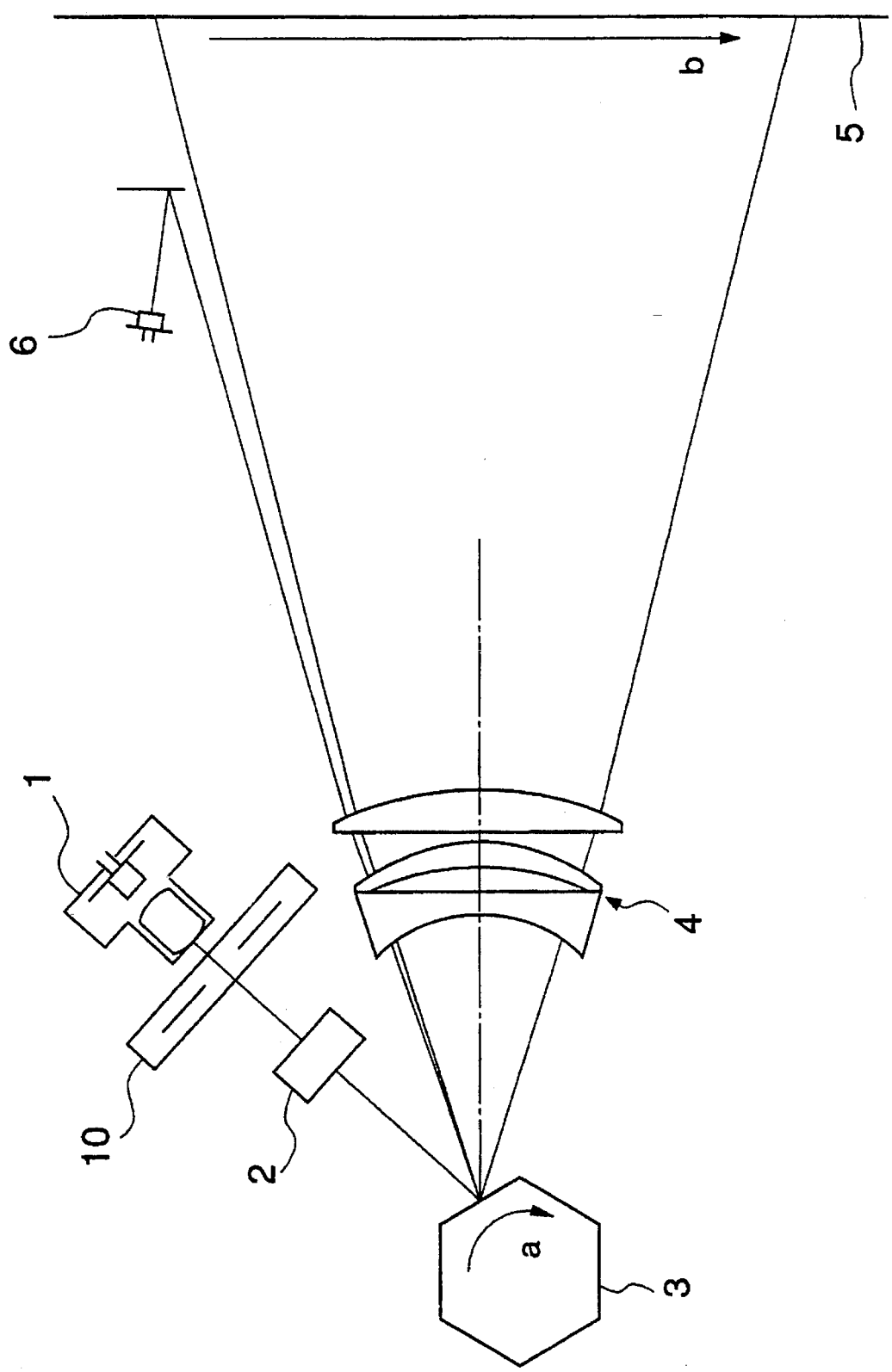
FIG. 6 is a diagram showing an embodiment of the laser beam scanning apparatus according to the present invention.

A description will now be given, with reference to FIGS. 5 and 6, of a preferred embodiment of the laser beam scanning apparatus according to the present invention. In FIGS. 5 and 6, the parts which are the same as the corresponding parts in FIGS. 1 and 2 are designated by the same reference numerals, and a description thereof will be omitted.

FIG. 5 shows a liquid crystal (LC) shutter of the laser beam scanning apparatus according to the present invention. FIG. 6 shows the preferred embodiment of the laser beam scanning apparatus according to the present invention. In the laser beam scanning apparatus in FIG. 6, the liquid crystal shutter 10 is arranged on the optical path from the light source unit 1 to the cylinder lens 2.

In the laser beam scanning apparatus of the present invention in FIG. 6, the light source unit 1 emits a collimated light beam toward the rotary polygon mirror 3. As shown in FIG. 5, the sectional shape of a collimated light beam Ro from the collimator lens 1b of the light source unit 1 is restricted by the opening 1e of the apertured part 1c. The sectional shape of the collimated light beam Ro is changed to the sectional shape of a collimated light beam Rs by the opening 1e of the apertured part 1c. The collimated light beam Rs from the light source unit 1 enters the liquid crystal (LC) shutter 10. The sectional shape of the collimated light beam Rs is changed to the sectional shape of a collimated light beam Rf by an opening of the LC shutter 10. The collimated light beam Rf, the sectional shape of which is restricted by the opening of the LC shutter 10, enters the cylinder lens 2.

As shown in FIG. 5, the liquid crystal (LC) shutter 10 has an opening by which the sectional shape of the collimated light beam on the optical path between the light source unit 1 and the cylinder lens 2 is restricted. The sectional shape of the opening of the LC shutter 10 can be set to an arbitrary sectional shape. The sectional dimensions of the opening of the LC shutter 10 can be set to sectional dimensions that are arbitrarily selected from among a plurality of predetermined sectional dimensions including a minimum opening size and a maximum opening size.

When a plurality of resolutions of images used by the image forming system are predetermined, the LC shutter 10 has an opening the sectional shape of which can be selected from among a plurality of predetermined sectional shapes of the opening. In the LC shutter 10, one of the predetermined sectional shapes is selected in accordance with the user's selection of the desired image resolution under the control of a control part (which will be described below).

Figure 9A:
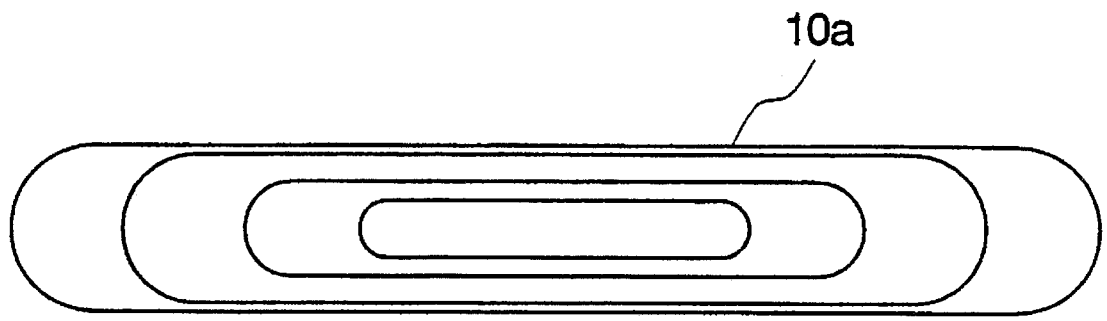
FIGS. 9A and 9B are diagrams showing examples of the sectional shapes of the opening of the liquid crystal shutter according to the present invention.
Figure 9B:
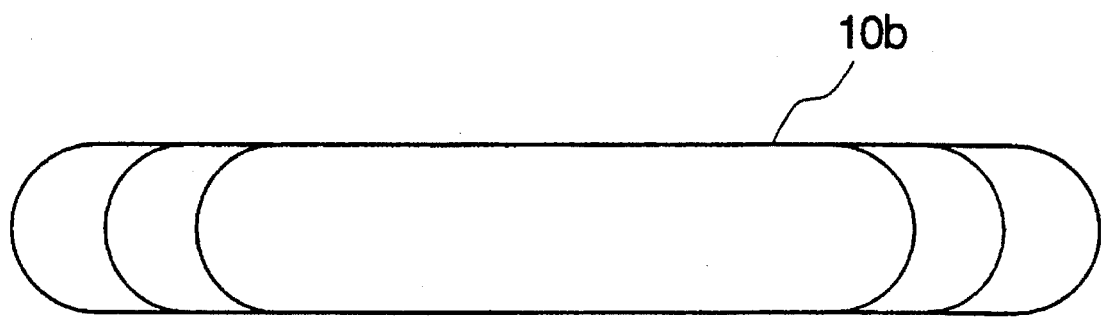

Two examples of the sectional shapes of the opening of the liquid crystal (LC) shutter according to the present invention are shown in FIGS. 9A and 9B, which will be described below. For other liquid crystal shutters which are known in the prior art, see Japanese Laid-Open Patent Application Nos. 57-29026 and 58-83814.

Next, the operation of the laser beam scanning apparatus of the present invention will be described. Similarly to the conventional device in FIGS. 1 and 2, the laser beam scanning apparatus of the present invention in FIGS. 5 and 6 comprises the light source unit 1, the cylinder lens 2, the rotary polygon mirror 3, the fΘ lens 4, and the sync photodetector 6. As shown in FIG. 6, the laser beam scanning apparatus of the present invention comprises the LC shutter 10 arranged on the optical path between the light source unit 1 and the cylinder lens 2.

In the light source unit 1 in FIG. 5, the laser diode (LD) 1a emits a laser light beam according to a light emission current supplied from the LD circuit of the LD circuit board 1d. The laser light beam from the laser diode (LD) 1a is converted into the collimated light beam Ro by the collimator lens 1b, and the collimated light beam Ro passes through the apertured part 1c of the light source unit 1.

Figure 3:
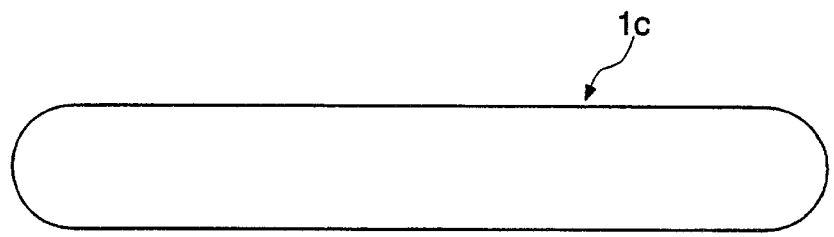
FIG. 3 is a diagram showing the sectional shape of an opening of an apertured part of the light source unit in FIG. 2.
Figure 4:
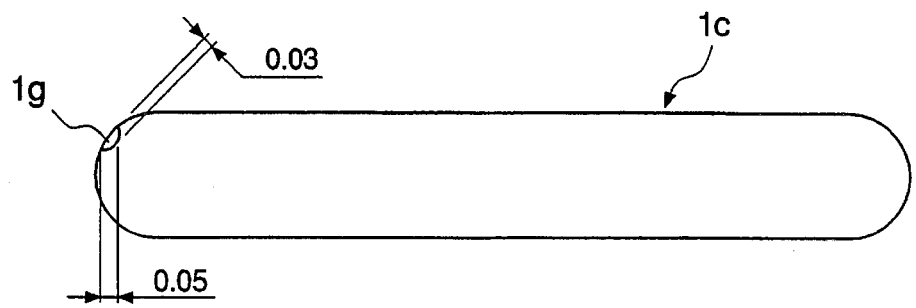
FIG. 4 is a diagram showing a burr at an edge of the opening of the aperture part in FIG. 3.

In order to make the sectional dimensions of the collimated light beam Ro great enough for practical use, the alignment of the collimator lens 1b within the light source unit 1 must be adjusted with an accuracy on the order of a few microns or less. The sectional dimensions of the collimated light beam Ro from the collimator lens 1b are restricted by the opening 1e of the apertured part 1c. The sectional shape of the opening of the apertured part 1c is shown in FIG. 3. The sectional dimensions of the collimated light beam Ro are changed to the sectional dimensions of the collimated light beam Rs by the opening 1e of the apertured part 1c.

The collimated light beam Rs from the light source unit 1 enters the liquid crystal (LC) shutter 10. The sectional dimensions of the collimated light beam Rs are changed to the sectional dimensions of the restricted light beam Rf by the variable opening of the LC shutter 10. The collimated light beam the sectional dimensions of which are restricted by the opening of the LC shutter 10 enters the cylinder lens 2.

As described above, the sectional shape of the opening of the LC shutter 10 can be set to an arbitrary sectional shape, and the sectional dimensions of the opening of the LC shutter 10 can be set to sectional dimensions that are selected from among a plurality of predetermined sectional dimensions including the minimum opening size and the maximum opening size. According to the present invention, a plurality of resolutions of images used by the image forming system are predetermined, and the liquid crystal shutter 10 has an opening the sectional shape of which is selected from among a plurality of predetermined sectional shapes.

In the LC shutter 10 mentioned above, one of the plurality of predetermined sectional shapes is selected in accordance with the user selection of the desired image resolution. The operation of the LC shutter 10 is controlled by a control part (which will be described below), and the sectional shape of the opening of the LC shutter 10 is selected under of the control of the control part in accordance with the user selection.

The LC shutter 10 according to the present invention has, preferably, openings shown in FIGS. 9A and 9B. In the LC shutters 10a and 10b shown in FIGS. 9A and 9B, the horizontal width of the respective LC shutter opening corresponds to the width of the collimated light beam in the main scanning direction, and the vertical width of the respective LC shutter opening corresponds to the diameter of the collimated light beam in the sub-scanning direction. Therefore, by varying the main-scanning-direction width of the collimated light beam by means of the LC shutter 10, the main-scanning-direction diameter of the light spot, focused on the recording medium 5 by the fΘ lens 4, can be changed to a desired value. By varying the sub-scanning-direction width of the collimated light beam by means of the LC shutter 10, the sub-scanning-direction diameter of the light spot mentioned above can be changed to a desired value.

In the opening of the LC shutter 10a shown in FIG. 9A, the sectional shape of the opening of the LC shutter can be set to an arbitrary sectional shape. The sectional dimensions of the LC shutter opening are set to sectional dimensions that are selected from among four different sectional dimensions including the minimum opening size and the maximum opening size. In the LC shutter 10a in FIG. 9A, one of four predetermined sectional shapes is selected in accordance with the user selection of a desired image resolution. The four predetermined sectional shapes of the opening of the LC shutter 10a respectively have widths that are different from each other in the main scanning direction and are different from each other in the sub-scanning direction, as shown in FIG. 9A. If the sectional shape of the opening of the LC shutter 10a in FIG. 9A is changed from one to another, both the main-scanning-direction diameter of the light spot and the sub-scanning-direction diameter thereof are changed accordingly.

In the opening of the LC shutter 10b shown in FIG. 9B, the sectional dimensions of the LC shutter opening are set to sectional dimensions that are selected from among three different sectional dimensions including the minimum opening size and the maximum opening size. In the LC shutter 10b in FIG. 9B, one of three predetermined sectional shapes is selected in accordance with the user selection of a desired image resolution. The three predetermined sectional shapes of the opening of the LC shutter 10b respectively have widths that are different from each other in the main scanning direction and are equal to each other in the sub-scanning direction, as shown in FIG. 9B. If the sectional shape of the opening of the LC shutter 10b in FIG. 9B is changed from one to another, only the main-scanning-direction diameter of the light spot is changed accordingly. Which of the openings shown in FIGS. 9A and 9B should be used in the LC shutter 10 depends on the type of images being formed and on the value of the image resolution being selected.

The LC shutter 10*b* having the opening shown in FIG. 9B is useful and efficient for preventing the occurrence of jitter on the recording medium or the irregularity of images in the sub scanning direction.

The above described embodiment of the laser beam scanning apparatus according to the present invention uses the LC shutter 10*b* having the opening the sectional shape of which is shown in FIG. 9B. In the laser beam scanning apparatus having the LC shutter 10*b*, one of the three predetermined sectional shapes is selected in accordance with the user selection of the desired resolution of images on the recording medium 5.

Figure 7:
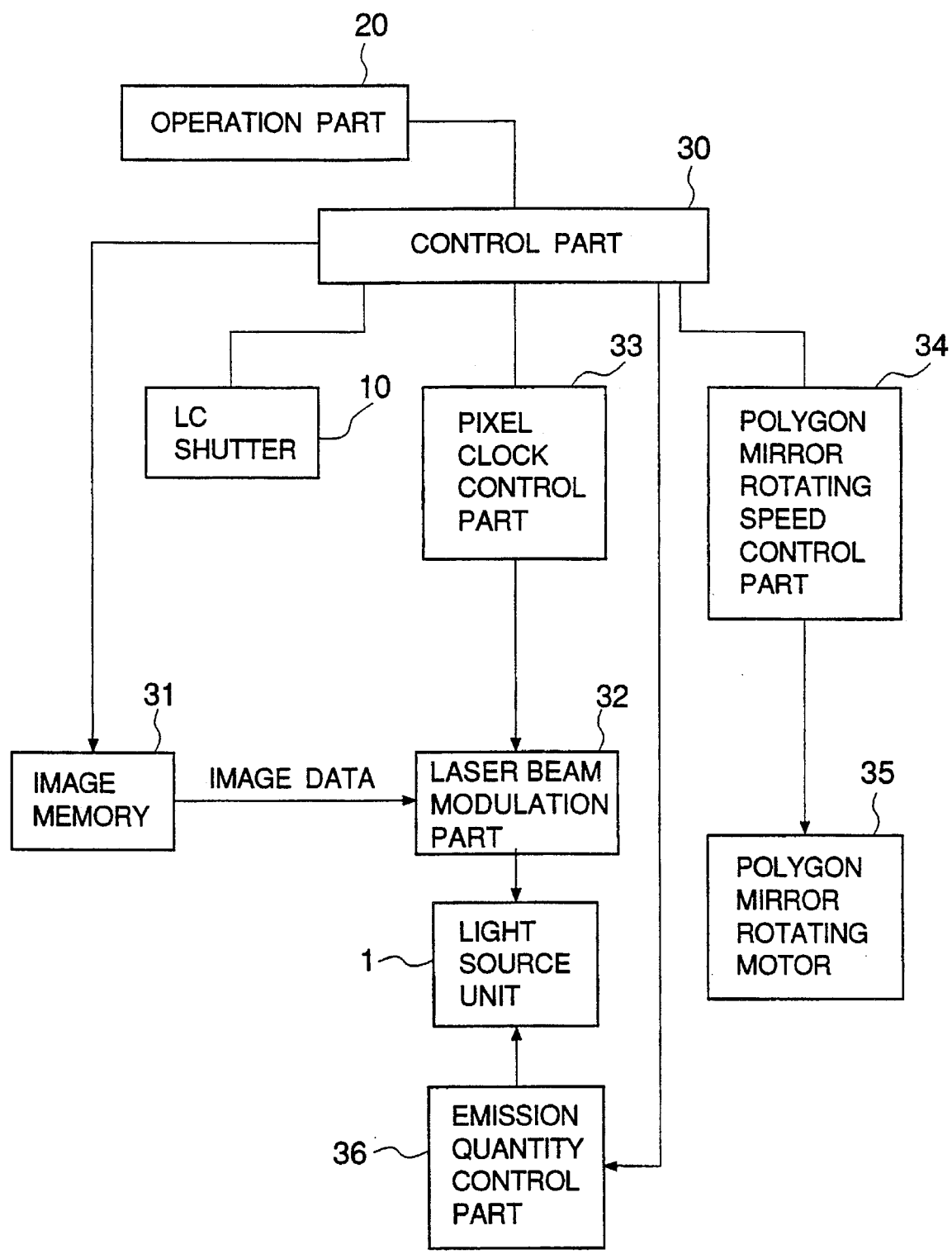
FIG. 7 is a block diagram showing a control system for controlling the operation of the laser beam scanning apparatus in FIG. 6.
Figure 8:
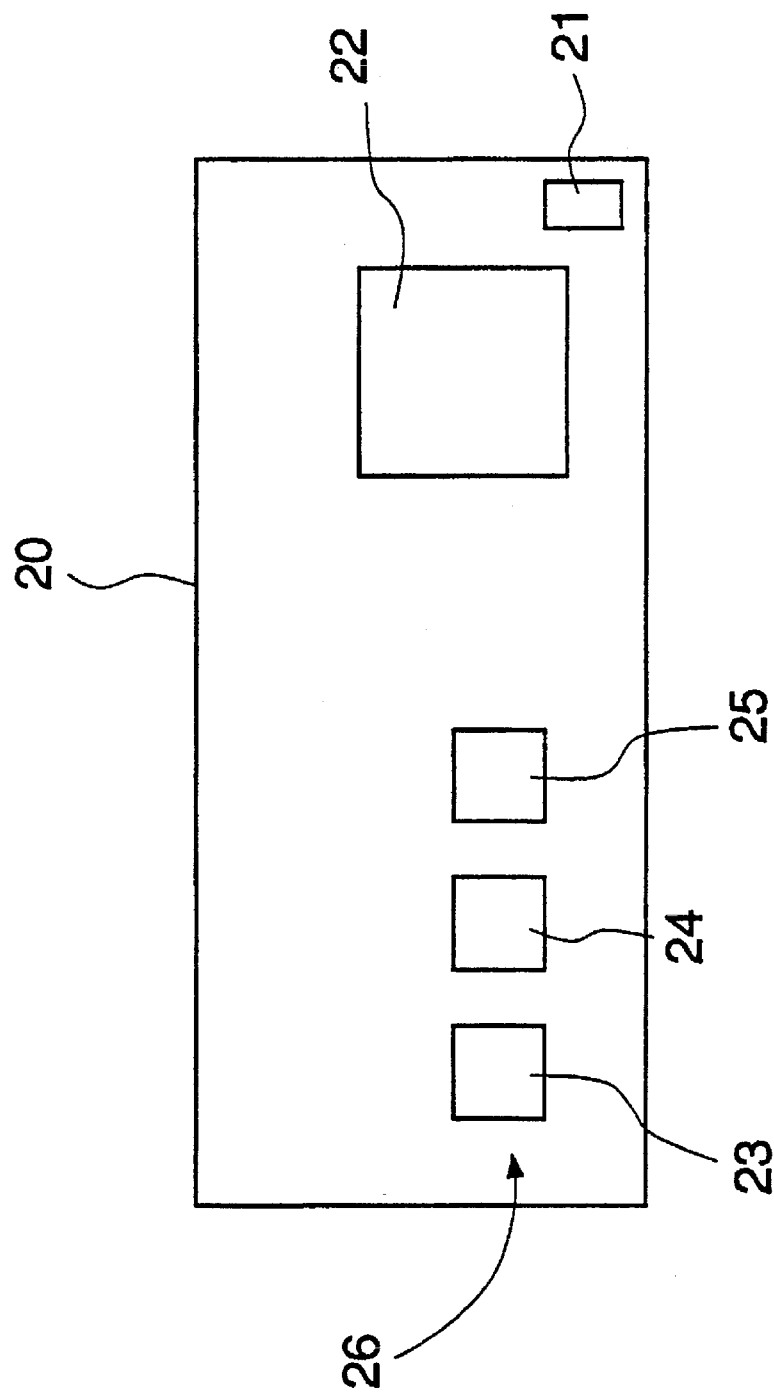
FIG. 8 is a diagram showing an operation part of the control system in FIG. 7.

FIG. 7 shows a control system for controlling the operation of the laser beam scanning apparatus shown in FIG. 6. The control system is provided within the image forming system. FIG. 8 shows an operation part of the control system in FIG. 7. The operation part is provided within the image forming system in order to allow the user to enter the user selection of the desired resolution of images on the recording medium 5.

As shown in FIG. 8, on the operation part 20, a copy start switch 21, ten numeric keys 22, and a plurality of resolution select keys 26 are provided. The user can input the user's selection of the desired resolution by depressing one of the plurality of resolution select keys 26.

The resolution select keys 26 on the operation part 20 include, for example, a normal-mode key 23, a fine-mode key 24, and a very-fine-mode key 25 as shown in FIG. 8. The normal-mode key 23 is depressed when the lowest resolution is desired so as to record, for example, a text image on the recording medium 5. The fine-mode key 24 is depressed when the intermediate resolution is desired so as to record, for example, a relatively fine text image on the recording medium 5. The very-fine-mode key 25 is depressed when the highest resolution is desired so as to record, for example, a very fine photographic or picture image on the recording medium 5.

The control system in FIG. 7 comprises the operation part 20 described above, a control part 30, an image memory 31, a laser beam modulation part 32, a pixel clock control part 33, a polygon mirror rotating speed control part 34, and an emission quantity control part 36. The control part 30 is made up of a microcomputer having a read-only-memory (ROM).

As previously described, one of the plurality of predetermined sectional shapes of the opening of the LC shutter 10 is selected under the control of the control part 30 in accordance with the user selection which is input through the operation part 20 described above. In addition, the control part 30 controls the operation of each of several other parts of the laser beam scanning apparatus of the present invention in accordance with the user selection. For example, the control part 30 controls the emission quantity control part 36 to set the intensity of the laser light beam emitted by the light source unit 1 in accordance with the user selection. The control part 30 controls the pixel clock control part 33 to set the laser beam emission clock in accordance with the user selection. The control part 30 controls the polygon mirror rotating speed control part 34 to set the rotating speed of the rotary polygon mirror 3 driven by a polygon mirror rotating motor 35 in accordance with the user selection.

As the operation of each of the above mentioned three parts of the laser beam scanning apparatus is controlled by the control part 30 in accordance with the user selection, an image can be recorded on the photosensitive medium 5 with the desired image resolution in appropriate recording conditions. Control parameters of each of the emission quantity control part 36, the pixel clock control part 33 and the polygon mirror rotating speed control part 34, which are used to operate the laser beam scanning apparatus in appropriate recording conditions, are predetermined for each of the plurality of predetermined image resolutions. The control parameters are stored, in advance, in the ROM of the control part 30. The microcomputer of the control part 30 carries out the control operation of each of the parts of the laser beam scanning apparatus by executing a control program, stored in the ROM, using the stored control parameters in accordance with the user selection.

The control operations of the above described control system are carried out based on the following formulas.

The scanning frequency Fv (Hz) is represented as follows.

$$Fv = (R/25.4) \cdot v \, (Hz)$$

where R is the resolution (dpi) of images produced by the optical writing unit, and v is the linear scanning speed (mm/sec) on the photosensitive medium 5.

The rotating speed Rm (revolutions per minute, or rpm) of the rotary polygon mirror 3 is represented as follows.

$$Rm = Fv \cdot (60/n) = (R \cdot v \cdot 60)/(25.4 \cdot n) \, (rpm)$$

where n is the number of mirror surfaces of the rotary polygon mirror 3.

Assuming that the effective scanning rate Er (%) is indicated by the formula: $Er = (n \cdot \Theta/360) \cdot 100 = n \cdot \Theta/3.6$ (%) where $\Theta$ is the effective polarization half-angle, the effective energy Q (erg/cm$^2$) incident on the photosensitive medium 5 is represented as follows.

$$Q = [(Po \cdot Er)/(L \cdot v)] \times 10^6 \, (erg/cm^2)$$

where Po is the required laser power (mW) on the photosensitive medium 5 and L is the effective image width (mm). From the above equation, the required laser power Po of the photosensitive medium 5 is represented as follows.

$$Po = (Q \cdot L \cdot v)/(Er \times 10^6) \, (mW)$$

In addition, the frequency Fh (Hz) of the laser beam writing clock is represented as follows.

$$\begin{aligned} Fh &= [(Fv \cdot L)/Er] \cdot (R/25.4) \times 10^6 \\ &= (R/25.4)^2 \times [(L \cdot v)/Er] \times 10^6 \end{aligned}$$

Generally, the relationship between the sectional dimensions of the collimated light beam from the light source unit 1 and the diameter of the light spot on the photosensitive medium 5 is an inversely proportional one for both the main scanning direction and the sub-scanning direction. In order to change the diameter of the light spot on the photosensitive medium 5 to a smaller diameter, it is necessary that the aperture part 1*c* changes the sectional dimensions of the collimated light beam from the light source unit 1 to be relatively large. In order to change the diameter of the light spot on the photosensitive medium 5 to a larger diameter, it is necessary that the aperture part 1*c* changes the sectional dimensions of the collimated light beam from the light source unit 1 to be relatively small.

As the opening of the aperture part 1c has fixed sectional dimensions, the LC shutter 10 of the laser beam scanning apparatus according to the present invention is controlled to change the sectional dimensions of the collimated light beam from the light source unit 1 to be relatively large when a smaller diameter of the light spot is desired, and the LC shutter 10 is controlled to change the sectional dimensions of the collimated light beam from the light source unit 1 to be relatively small when a larger diameter of the light spot is desired.

In addition, in the above described embodiment of the laser beam scanning apparatus, the sectional shape of the collimated light beam emitted toward the rotary polygon mirror 3 is changed by both the apertured part 1c and the LC shutter 10. It is possible to provide a laser beam scanning apparatus in which the sectional shape of the collimated light beam is changed by the LC shutter 10 only. However, the occurrence of flared light or diffracted light at the collimator lens 1b and the apertured part 1c can be prevented by changing the sectional shape of the collimated light beam by using both the apertured part 1c and the LC shutter 10 as in the above described embodiment. In order to achieve a better laser beam scanning function, it is necessary to make the optical path distance between the apertured part 1c and the LC shutter 10 as great as possible.

In the above described embodiment, the control system shown in FIG. 7 controls the operation of each of the laser diode 1a, the LC shutter 10 and the rotary polygon mirror 3. As previously described, the control part 30 controls the operation of the LC shutter 10, and selects one of a plurality of predetermined sectional shapes of the opening of the LC shutter 10 in accordance with the user's selection which is input through the operation part 20.

In the control system shown in FIG. 7, image data is temporarily stored in the image memory 31, and the stored image data is read out to the laser beam modulation part 32. The light emission current is modulated by the laser beam modulation part 32 in accordance with the image data. The laser diode (LD) 1a of the light source unit 1 emits a laser light beam according to the light emission current from the laser beam modulation part 32. The control part 30 controls the timing of the image data writing to and the timing of the image data reading from the image memory 31.

In addition, the control part 30 controls the operation of the emission quantity control part 36 so as to adjust the intensity of the laser light beam emitted by the light source unit 1 in accordance with the user selection. The control part 30 controls the operation of the pixel clock control part 33 so as to adjust the laser beam emission clock in accordance with the user selection. The control part 30 controls the operation of the polygon mirror rotating speed control part 34 so as to adjust the rotating speed of the rotary polygon mirror 3 driven by the polygon mirror rotating motor 35 in accordance with the user selection.

Next, the control operation of the control part 30 to select one of a plurality of predetermined sectional shapes of the LC shutter opening will be described in greater detail. To select a desired resolution of images produced on the recording medium, one of the plurality of the resolution select keys 26 on the operation part 20 is depressed by the user. The resolution select keys 26 are, for example, the normal-mode key 23, the fine-mode key 24, and the very-fine-mode key 25 which are shown in FIG. 8. As described above, the control part 30 selects one of the plurality of predetermined sectional shapes of the opening of the LC shutter 10 in accordance with the user selection of the desired resolution.

When the normal-mode key 23 is depressed, the diameter of the light spot in the main scanning direction in accordance with the desired resolution is equal to, for example, 10 microns. The control part 30 controls the operation of the pixel clock control part 33 so as to set the laser beam emission clock of the laser beam modulation part 32 to 20 MHz which is an emission clock frequency appropriate for the normal-mode resolution selected by the user. The control part 30 controls the operation of the polygon mirror rotating speed control part 34 so as to set the rotating speed of the polygon mirror rotating motor 35 to 10,000 rpm which is a rotating speed appropriate for the desired image resolution.

When the fine-mode key 24 is depressed, the diameter of the light spot in the main scanning direction in accordance with the desired resolution is equal to, for example, 8 microns. The control part 30 controls the operation of the pixel clock control part 33 so as to set the laser beam emission clock of the laser beam modulation part 32 to 31.25 MHz which is an emission clock frequency appropriate for the fine-mode resolution selected by the user. The control part 30 controls the operation of the polygon mirror rotating speed control part 34 so as to set the rotating speed of the polygon mirror rotating motor 35 to 12,500 rpm which is a rotating speed appropriate for the desired image resolution.

When the very-fine-mode key 25 is depressed, the diameter of the light spot in the main scanning direction in accordance with the desired resolution is equal to, for example, 6 microns. The control part 30 controls the operation of the pixel clock control part 33 so as to set the laser beam emission clock of the laser beam modulation part 32 to 55.6 MHz which is an emission clock frequency appropriate for the very-fine-mode resolution selected by the user. The control part 30 controls the operation of the polygon mirror rotating speed control part 34 so as to set the rotating speed of the polygon mirror rotating motor 35 to 16,700 rpm which is a rotating speed appropriate for the desired image resolution.

In the above described embodiment, the rotating speed of the photosensitive medium 5 is maintained at a constant speed, and the sectional shape of a collimated light beam on the optical path from the light source unit 1 to the rotary polygon mirror 3 is restricted by a selected one of a plurality of predetermined opening shapes of the LC shutter 10. According to the present invention, when one of the plurality of predetermined opening shapes of the LC shutter 10 is selected for a desired resolution, the rotating speed of the rotary polygon mirror 3 is changed to an appropriate speed in accordance with the user selection, and the laser beam emission clock of the laser beam modulation part 32 is also changed to an appropriate emission clock frequency in accordance with the user selection. Thus, the multiple-resolution capability of the image forming system mentioned above can be realized by the electrical control operation of the control part 30.

The sectional shape of the opening of the liquid crystal shutter 10 can be set to an arbitrary sectional shape, and the sectional dimensions of the opening of the LC shutter 10 can be set to sectional dimensions that are selected from among a plurality of predetermined sectional dimensions including the minimum opening size and the maximum opening size. In addition, under the control of the control part 30 according to the present invention, the LC shutter 10 is set to its fully closed condition when the laser beam scanning of the laser beam scanning apparatus is stopped.

A recent image forming system of a certain type has the function of recording multi-tone dots on a recording medium. In order to make the gradation rise characteristic of low-level tone dots of such an image forming system suitable, a dark current is supplied to the laser diode (LD) 1a of the light source unit 1 when the rotation of the rotary polygon mirror 3 is stopped in order to stop the laser beam scanning the recording medium. When the dark current is supplied to the laser diode 1a, a faint laser light beam is emitted from the light source unit 1 toward the rotary polygon mirror 3. However, if the time period during which the laser beam scanning operation is stopped is excessively long, the photosensitive medium 5 becomes deteriorated due to the long-period exposure to the laser light beam from the light source unit 1.

In order to eliminate the above mentioned problem, the opening of the LC shutter 10 is set to the fully closed condition when the laser beam scanning is stopped, so as to prevent the laser light beam emitted by the light source unit 1 from reaching the photosensitive medium 5. In the laser beam scanning apparatus in which the opening of the LC shutter 10 is controlled in this manner, it is possible to prevent the deterioration of the photosensitive medium 5 due to the long-period exposure to the laser light beam from the light source unit 1.

Generally, the sectional shape of the light spot on the photosensitive medium varies during one main scanning. In the laser beam scanning apparatus according to the present invention, the sectional shape of the opening of the LC shutter 10 can be controlled in accordance with the change of the sectional shape of the light spot during one main scanning, so as to vary the sectional shape of the collimated laser light beam. It is possible that the laser beam scanning apparatus thus eliminates the variations of the sectional shape of the light spot.

Further, the present invention is not limited to the above described embodiments, and variations and modifications may be made without departing from the scope of the present invention.

What is claimed is:

1. A laser beam scanning apparatus comprising:

a light source emitting a collimated laser light beam;

a rotary deflector deflecting a laser light beam arriving from said light source means;

a focusing mechanism converting the deflected light beam into a convergent light beam, and focusing the convergent light beam on a recording medium as a light spot, so that the focused light beam scans the recording medium in a main scanning direction when said rotary deflector is rotated;

a beam shape control mechanism changing the sectional shape of a laser light beam emitted by said light source to a first sectional shape by restricting the laser light beam by using an opening of said beam shape control mechanism, said opening of said beam shape control mechanism having a predetermined sectional shape and predetermined dimensions, so that a diameter of the light spot on the recording medium is changed to a desired diameter;

an apertured part having an opening by which the sectional shape of the collimated laser light beam emitted by the light source means is restricted, the sectional shape of a laser light beam from said aperture part being changed to the first sectional shape by said beam shape control mechanism, wherein the beam shape control mechanism comprises a liquid crystal shutter, said liquid crystal shutter is arranged on an optical path from said light source to said rotary deflector, and said liquid crystal shutter has an opening by which the sectional shape of the laser light beam from said light source is restricted;

the liquid crystal shutter is arranged on said optical path between said apertured part and said rotary deflector; and both the laser light beam from said apertured part and a laser light beam from said liquid crystal shutter of said beam shaped control mechanism are parallel to the main scanning direction and parallel to a sub-scanning direction perpendicular to the main scanning direction.

2. A laser beam scanning apparatus according to claim 1, wherein said beam shape control mechanism comprises a control mechanism selecting one of a plurality of predetermined sectional shapes in accordance with a user's selection and setting the opening of said beam shape control mechanism to said selected one of the plurality of predetermined sectional shapes.

3. A laser beam scanning apparatus according to claim 1, wherein said beam shape control mechanism comprises a control mechanism controlling an emission quantity control part to set the emission quantity of the laser beam emitted by the light source in accordance with a user's selection.

4. A laser beam scanning apparatus according to claim 1, wherein said beam shape control mechanism comprises a control mechanism controlling a pixel clock control part to set a laser beam emission clock frequency in accordance with a user's selection.

5. A laser beam scanning apparatus comprising:

a light source emitting a collimated laser light beam;

a rotary deflector deflecting a laser light beam arriving from said light source;

a focusing mechanism converting the deflected light beam into a convergent light beam and focusing the convergent light beam on a recording medium as a light spot, so that the focused light beam scans the recording medium in a main scanning direction when said rotary deflector is rotated; and a beam shape control mechanism changing the sectional shape of a laser light beam emitted by said light source to a first sectional shape by restricting the laser light beam by using an opening of said beam shape control mechanism, said opening of said beam shape control mechanism having a predetermined sectional shape and predetermined dimensions, so that a diameter of the light spot on the recording medium is changed to a desired diameter;

wherein said beam shape control mechanism comprises a control mechanism controlling a rotating speed control part to set the rotating speed of the rotary deflector driven by a rotating motor in accordance with a user's selection.

6. A laser beam scanning apparatus according to claim 5, wherein said beam shape control mechanism comprises a control mechanism selecting one of a plurality of predetermined sectional shapes in accordance with a user selection and setting the opening of said beam shape control mechanism to said selected one of the plurality of predetermined sectional shapes.

7. A laser beam scanning apparatus according to claim 5, wherein said beam shape control mechanism comprises a control mechanism controlling an emission quantity control part to set the emission quantity of the laser beam emitted by the light source in accordance with a user's selection.

8. A laser beam scanning apparatus according to claim 5, wherein said beam shape control mechanism comprises a control mechanism controlling a pixel clock control part to set a laser beam emission clock frequency in accordance with a user's selection.

9. A laser beam scanning apparatus comprising:

a light source means emitting a collimated laser light beam;

a rotary deflector deflecting a laser light beam arriving from said light source;

a focusing mechanism converting the deflected light beam into a convergent light beam and focusing the convergent light beam on a recording medium as a light spot, so that the focused light beam scans the recording medium in a main scanning direction when said rotary deflector means is rotated; and a beam shape control mechanism changing the sectional shape of a laser light beam emitted by said light source to a first sectional shape by restricting the laser light beam by using an opening of said beam shape control mechanism, said opening of said beam shape control mechanism having a predetermined sectional shape and dimensions, so that a diameter of the light spot on the recording medium is changed to a desired diameter;

wherein said beam shape control mechanism comprises a liquid crystal shutter, said liquid crystal shutter being arranged on an optical path from said light source to said rotary deflector, and said liquid crystal shutter having an opening by which the sectional shape of the laser light beam from said light source is restricted; and wherein said beam shape control mechanism sets the opening of the liquid crystal shutter to a fully closed condition when the laser beam scanning of the laser beam scanning apparatus on the recording medium is stopped.

10. A laser beam scanning apparatus according to claim 9, wherein said beam shape control mechanism comprises a control mechanism selecting one of a plurality of predetermined sectional shapes in accordance with a user's selection and setting the opening of said beam shape control mechanism to said selected one of the plurality of predetermined sectional shapes.

11. A laser beam scanning apparatus according to claim 9, wherein said beam shape control mechanism comprises a control mechanism controlling an emission quantity control part to set the emission quantity of the laser beam emitted by the light source mechanism in accordance with a user's selection.

12. A laser beam scanning apparatus according to claim 9, wherein said beam shape control mechanism comprises a control mechanism controlling a pixel clock control part to set a laser beam emission clock frequency in accordance with a user's selection.

13. A laser beam scanning apparatus comprising:

a light source emitting a collimated laser light beam;

a rotary deflector deflecting a laser light beam arriving from said light source;

a focusing mechanism converting the deflected light beam into a convergent light beam and focusing the convergent light beam on a recording medium as a light spot, so that the focused light beam scans the recording medium in a main scanning direction when said rotary deflector is rotated; and a beam shape control mechanism changing the sectional shape of a laser light beam emitted by said light source to a first sectional shape by restricting the laser light beam by using an opening of said beam shape control mechanism, said opening of said beam shape control means having a predetermined sectional shape and dimensions, so that a diameter of the light spot on the recording medium is changed to a desired diameter;

wherein said beam shape control mechanism comprises a liquid crystal shutter, said liquid crystal shutter being arranged on an optical path from said light source to said rotary deflector, and said liquid crystal shutter having an opening by which the sectional shape of the laser light beam from said light source is restricted, wherein said liquid crystal shutter has an opening, the sectional shape of which is selected from among a plurality of predetermined sectional shapes which includes the first sectional shape, said predetermined sectional shapes having sectional dimensions that are different from each other in a first scanning direction and are the same in a second scanning direction, and wherein said laser beam scanning apparatus includes an apertured part having an opening by which the sectional shape of the collimated laser light beam emitted by the light source is restricted, the sectional shape of a laser light beam from said apertured part being changed to the first sectional shape by said beam control mechanism wherein the liquid crystal shutter is arranged on said optical path between said apertured part and said rotary deflector; and both the laser light beam from said apertured part and a laser light beam from said liquid crystal shutter of said beam shaped control mechanism are parallel to the main scanning direction and parallel to a sub-scanning direction perpendicular to the main scanning direction.

14. A laser beam scanning apparatus comprising:

a light source emitting a collimated laser light beam;

a rotary deflector deflecting a laser light beam arriving from said light source;

a focusing mechanism converting the deflected light beam into a convergent light beam, and focusing the convergent light beam on a recording medium as a light spot, so that the focused light beam scans the recording medium in a main scanning direction when said rotary deflector is rotated; and a beam shape control mechanism changing the sectional shape of a laser light beam emitted by said light source to a first sectional shape by restricting the laser light beam by using an opening of said beam shape control mechanism, said opening of said beam shape control mechanism having a predetermined sectional shape and predetermined dimensions, so that a diameter of the light spot on the recording medium is changed to a desired diameter;

wherein said beam shape control mechanism comprises a liquid crystal shutter, said liquid crystal shutter being arranged on an optical path from said light source to said rotary deflector, and said liquid crystal shutter having an opening by which the sectional shape of the laser light beam from said light source is restricted, wherein said liquid crystal shutter has an opening, the sectional shape of which is selected from among a plurality of predetermined sectional shapes which includes the first sectional shape, said predetermined sectional shapes having sectional dimensions that are different from each other in a first scanning direction and are the same in a second scanning direction, and wherein said beam shape control mechanism comprises a control mechanism controlling a rotating speed control part, said rotating speed control setting the rotating speed of the rotary deflector driven by a rotary motor in accordance with a user's selection.

15. A laser beam scanning apparatus comprising:

a light source emitting a collimated laser light beam;

a rotary deflector deflecting a laser light beam arriving from said light source;

a focusing mechanism converting the deflected light beam into a convergent light beam, and focusing the convergent light beam on a recording medium as a light spot, so that the focused light beam scans the recording medium in a main scanning direction when said rotary deflector is rotated; and a beam shape control mechanism changing the sectional shape of a laser light beam emitted by said light source to a first sectional shape by restricting the laser light beam by using an opening of said beam shape control mechanism said opening of said beam shape control mechanism having a predetermined sectional shape and dimensions, so that a diameter of the light spot on the recording medium is changed to a desired diameter, wherein said beam shape control mechanism comprises a liquid crystal shutter, said liquid crystal shutter being arranged on an optical path from said light source to said rotary deflector, and said liquid crystal shutter having an opening by which the sectional shape of the laser light beam from said light source is restricted, wherein said liquid crystal shutter has an opening, the sectional shape of which is selected from among a plurality of predetermined sectional shapes which includes the first sectional shape, said predetermined sectional shapes having sectional dimensions that are different from each other in a first scanning direction and the same in a second scanning direction, and wherein said beam shape control mechanism sets the opening of the liquid crystal shutter to a fully closed condition when the laser beam scanning of the laser beam scanning apparatus on the recording medium is stopped.

* * * * *